United States Patent
Yang et al.

(10) Patent No.: US 9,050,749 B1
(45) Date of Patent: Jun. 9, 2015

(54) BLOW MOLDING DEVICE FOR A ROTARY BOTTLE BLOWING MACHINE

(71) Applicant: CHUMPOWER MACHINERY CORP., Taichung County (TW)

(72) Inventors: Wen-Yung Yang, Taichung County (TW); Po-Cheng Lai, Taichung County (TW); Xuan-Quyen Nguyen, Taichung County (TW)

(73) Assignee: CHUMPOWER MACHINERY CORP., Taichung County (TW)

( * ) Notice: Subject to any disclaimer, the term of this patent is extended or adjusted under 35 U.S.C. 154(b) by 0 days.

(21) Appl. No.: 14/152,154

(22) Filed: Jan. 10, 2014

(51) Int. Cl.
*B29C 49/36* (2006.01)
*B29C 49/56* (2006.01)
*B29C 49/42* (2006.01)

(52) U.S. Cl.
CPC ............. *B29C 49/4236* (2013.01); *B29C 49/36* (2013.01); *B29C 2049/566* (2013.01); *B29C 49/56* (2013.01)

(58) Field of Classification Search
CPC .... B29C 49/36; B29C 49/4236; B29C 49/56; B29C 2049/566; B29C 49/4268
See application file for complete search history.

(56) References Cited

U.S. PATENT DOCUMENTS

| 3,843,286 | A | * | 10/1974 | Horberg et al. | 425/526 |
| 5,064,366 | A | * | 11/1991 | Voss | 425/541 |
| 8,100,688 | B2 | | 1/2012 | Litzenberg et al. | |
| 2010/0272844 | A1 | * | 10/2010 | Dordoni | 425/210 |
| 2012/0177771 | A1 | | 7/2012 | Graffin | |

FOREIGN PATENT DOCUMENTS

DE 102008045569 A1 3/2010

* cited by examiner

*Primary Examiner* — Robert B Davis (57) ABSTRACT

A blow molding device for a rotary bottle blowing machine includes just needs one drive source to rotate a coaxial drive device, then first, second and third control members will move the movable mold portion, the bottom mold portion and the locking block, to carry out the operation of mold opening and closing, lifting of the bottom mold portion, and locking and unlocking of the locking block. Therefore, the structure of the blow molding device is simplified, and operation efficiency is improved, and cost is reduced.

9 Claims, 12 Drawing Sheets

BLOW MOLDING DEVICE FOR A ROTARY BOTTLE BLOWING MACHINE

BACKGROUND OF THE INVENTION

1. Field of the Invention

The present invention relates to a rotary bottle blowing machine, and more particularly to a blow molding device for the rotary bottle blowing machine.

2. Description of the Prior Art

Figure 1:
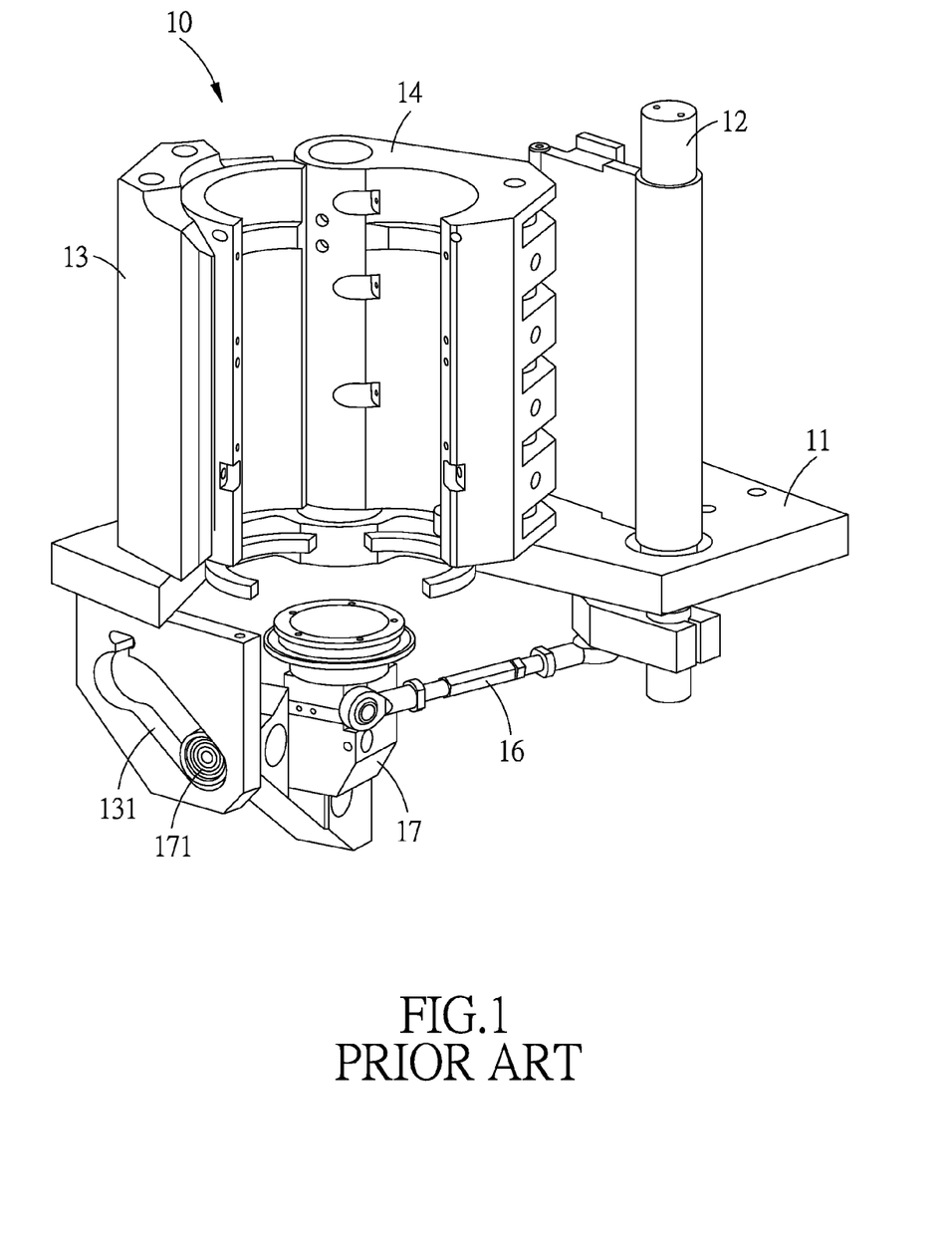
FIG. 1 shows a mold open state of a first conventional blow molding device.
Figure 2:
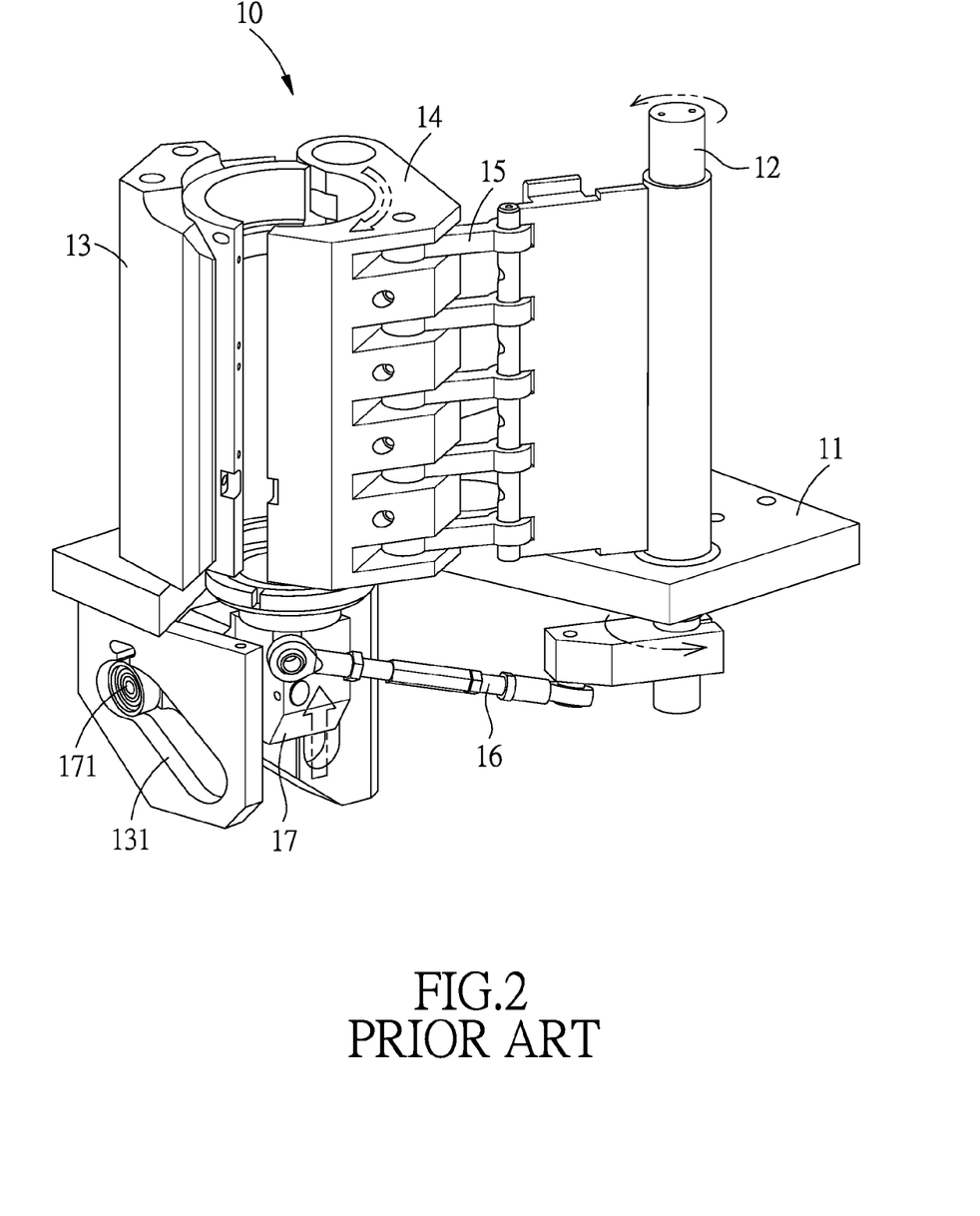
FIG. 2 shows a mold closed state of the first conventional blow molding device.

FIGS. 1 and 2 show a device for blow molding containers, which is disclosed in U.S. Pat. No. 8,100,688, wherein the blow molding station 10 essentially comprises a drive shaft 12 rotatably disposed on a support structure 11. On the support structure 11 are further fixed a stationary mold portion 13 and a movable mold portion 14 capable of pivoting with respect to the stationary mold portion 13. At the bottom of the stationary mold portion 13 is formed a cam track 131. The drive shaft 12 is connected to the movable mold portion 14 by a first connecting member 15 which is perpendicular to the drive shaft 12, and is connected to a base mold portion 17 via a second connecting member 16 which is located in a direction different to the extending direction of the drive shaft 12. At the base mold portion 17 is provided a cam 171 which is movably disposed in the cam track 131. When the drive shaft 12 rotates, the first and second connecting members 15, 16 will push the movable mold portion 14 to pivot with respect to the stationary mold portion 13, meanwhile, pushing the base mold portion 17 to move up and down by moving the cam 171 along the cam track 131. The drive shaft 12 of the blow molding station 10 generally uses the connecting members 15, 16 which extend in different directions, to open or close the movable mold portion 14, and to move the base mold portion 17 up and down, respectively. Therefore, the connecting members 15, 16 of the drive shaft 12 become the weak point of the whole blow molding station. Furthermore, both ends of the connecting members 15, 16 are pivotally connected to the drive shaft 12, the movable mold portion 14 and the base mold portion 17. The pivotal connecting points will affect the smoothness, accurateness and efficiency of the operation of the blow molding station. The requirements on the structural accuracy and quality are very strict and difficult to control, therefore, the device for blow molding containers as disclosed in U.S. Pat. No. 8,100,688 is difficult to assemble, high cost, and the structural accuracy is difficult to control.

Figure 3:
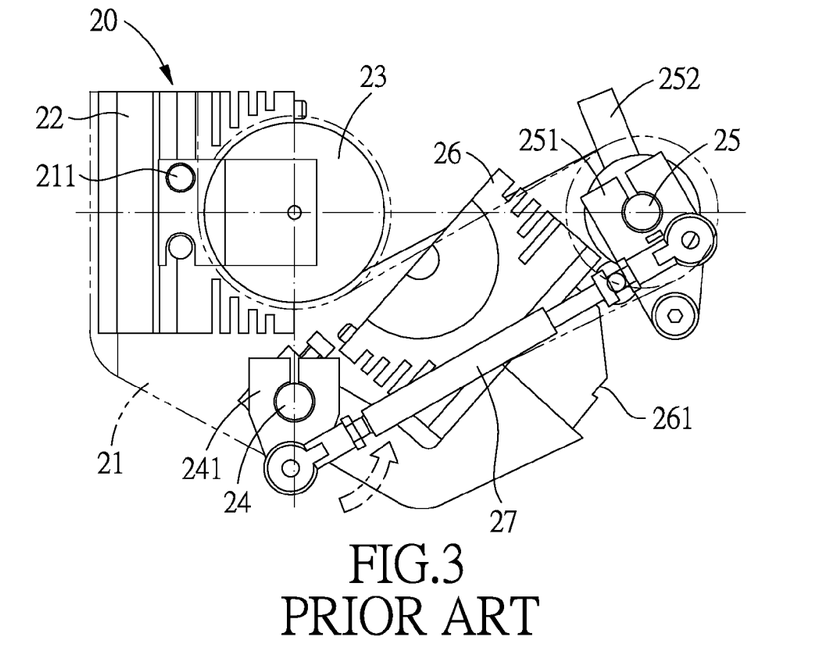
FIG. 3 shows a mold open state of a second conventional blow molding device.
Figure 4:
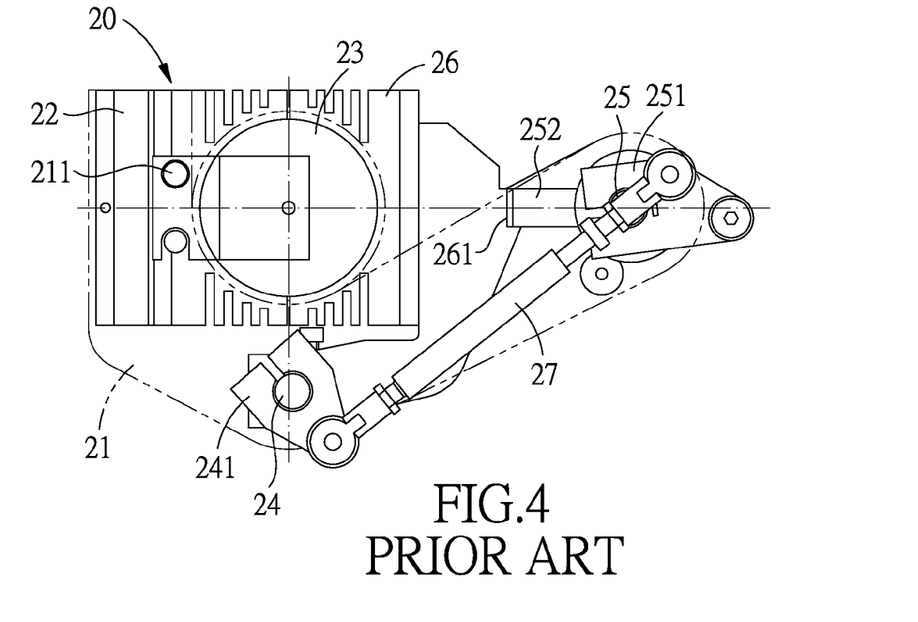
FIG. 4 shows a mold closed state of the second conventional blow molding device.

FIGS. 3 and 4 show another device for blow molding containers, which is disclosed in U.S Application No. 20120177771A1, wherein the blow molding station 20 is provided with a fixed platform 21, a stationary mold portion 22 fixed at one side of the fixed platform 21, and columns 211 disposed at another side of the fixed platform 21 and connected a base mold portion 23. The fixed platform 21 is further provided with a first drive shaft 24 and a second drive shaft 25. The first drive shaft 24 is connected to a movable mold portion 26 via a first crank 241. The movable mold portion 26 includes a vertical abutment 261, the first crank 241 is connected to a second crank 251 fixed to the second drive shaft 25 by a connecting member 27 which is arranged perpendicular to the extending direction of the first and second drive shafts 24, 25, and both ends of the connecting member 27 are connected in a pivotal manner. The second drive shaft 25 is provided with a strut 252 formed in the shape of the abutment 261. To move the movable mold portion 26 and the base mold portion 23, it has to use a drive source to move the base mold portion 23 up and down, and another drive source to rotate the first drive shaft 24, therefore, the structure of the device of U.S Application No. 20120177771A1 is too complicated and high cost. During operation, the first drive shaft 24 rotates the first crank 241 and the movable mold portion 26, so as to control opening and closing of the mold. Meanwhile, the connecting member 27 connected to the first crank 241 moves the second crank 251, the second crank 251 then rotates the second drive shaft 25 and the strut 252. When the movable mold portion 26 performs mold-closing motion, the strut 252 also moves and will stop against the abutment 261 of the movable mold portion 26, so that the movable mold portion 26 can stably take up the blow-molding force during blow molding process, ensuring molding accuracy.

However, in addition to the disadvantages of complicated structure, high cost, and requiring two drive sources to open and close the mold and lift the base mold portion, the device of U.S Application No. 20120177771A1 also has to use the connecting member 27 which is perpendicular to the extending direction of the first and second drive shafts 24, 25 to move the strut 252. The connecting member 27 becomes the weak point of the whole structure, and both ends of the connecting member 27 are also connected in a pivot manner, as a result, the requirements on the structural accuracy and quality of device of U.S Application No. 20120177771A1 are very strict and difficult to control.

Figure 5:
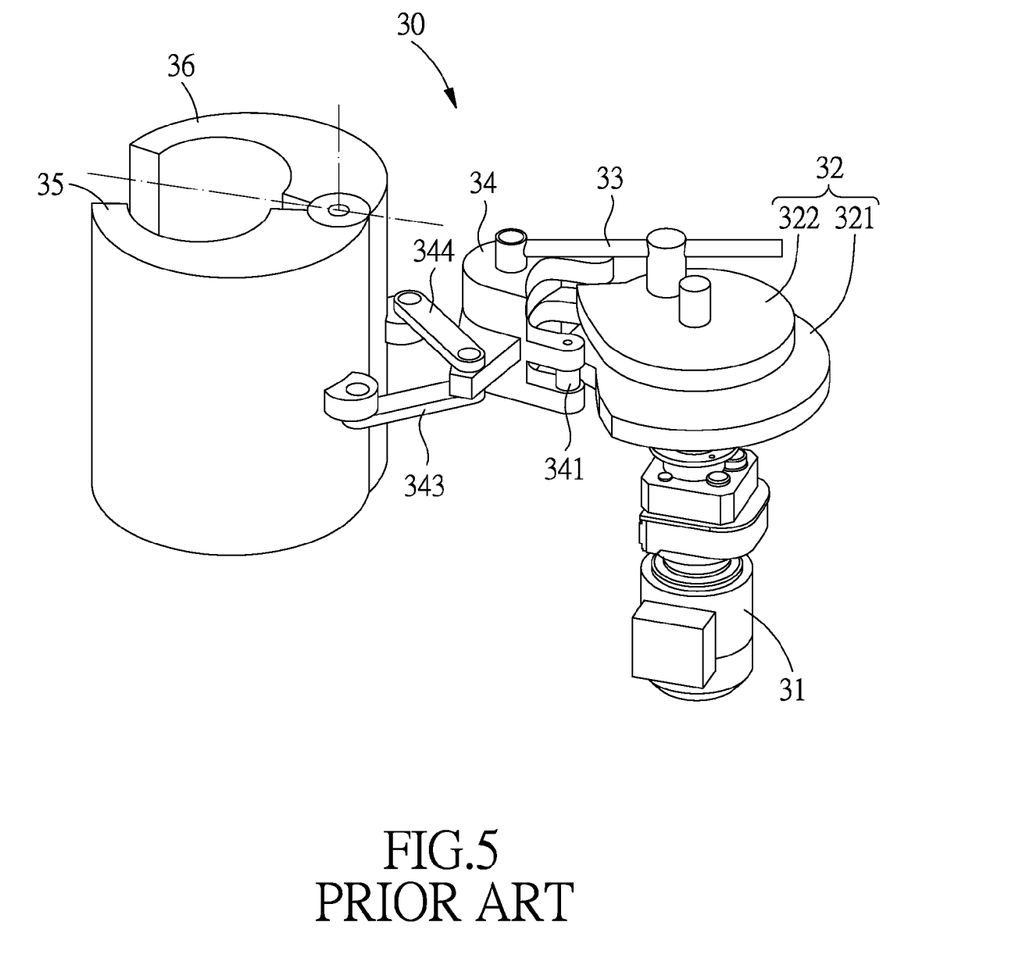
FIG. 5 shows a mold open state of a third conventional blow molding device.
Figure 6:
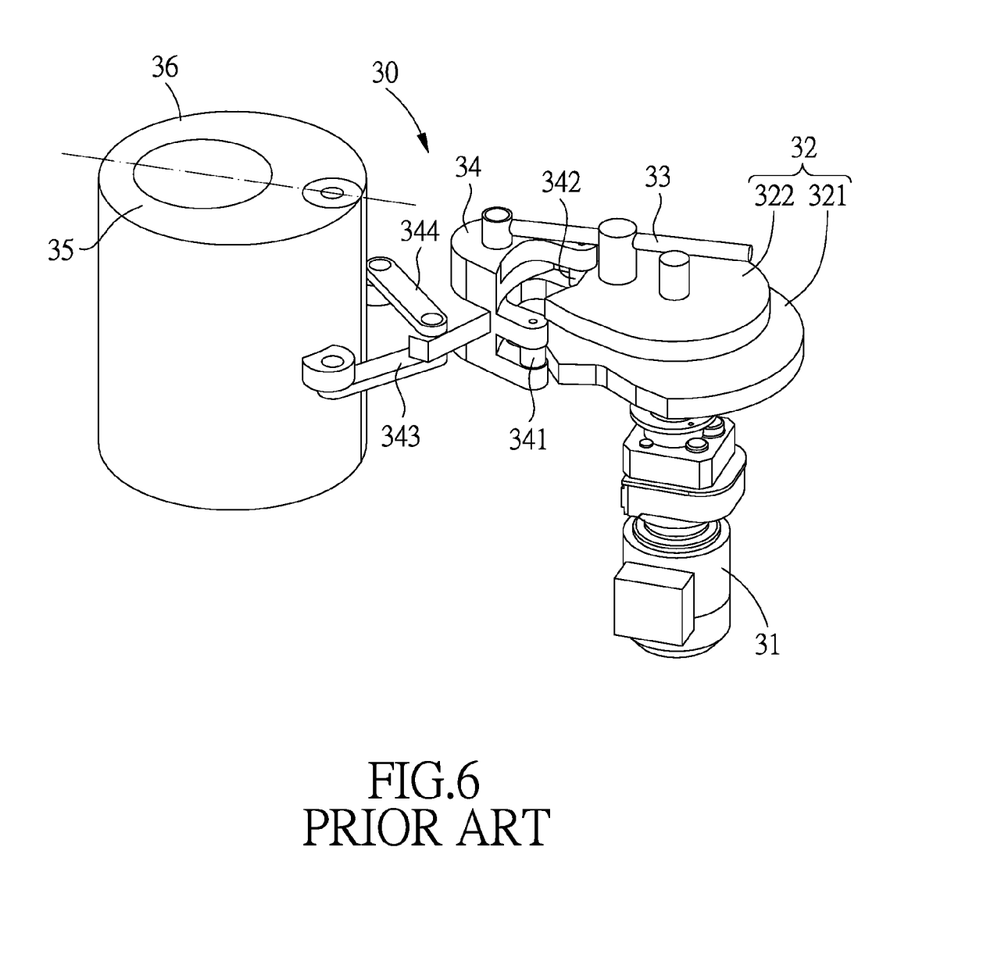
FIG. 6 shows a mold closed state of the third conventional blow molding device.

FIGS. 5 and 6 show another device for blow molding containers, which is disclosed in German Patent application No. DE102008045569A1, wherein the blow molding device 30 employs a drive source 31 to rotate a control member 32 which includes a first cam 321 and a second cam 322. The control member 32 is connected to a clamping drive member 34 by a connecting member 33. The clamping drive member 34 is provided at one side thereof with a first pivot 341 and a second pivot 342 which are abutted against the first and second cams 321, 322, respectively. Another side of the clamping drive member 34 is pivoted to a first and a second driven rods 343, 344 which are connected to two mold portions 35, 36, respectively. The drive source 31 rotates the control member 32, when the control member 32 rotates, the first and second cams 321, 322 rotate synchronously, to change the positions of the first and second pivots 341, 342 with respect to the first and second cams 321, 322, consequently making the clamping drive member 34. Then, the movement of the clamping drive member 34 can further change the positions of the first and second pivots 341, 342, thus making the first and second pivots 341, 342 move the two mold portions 35, 36 to carry out mold opening and closing.

However, the device disclosed in German Patent application No. DE102008045569A1 still can't use a single drive source to perform mold lifting and mold closing. In addition to the fact that the control member of the blow molding device 30 has to use the drive source to move the clamping drive member, the clamping drive member also has to be provided with the first and second pivots 341, 342 in order to perform mold closing. Since the mold portions 35, 36 are driven by the clamping drive member 34 in an indirect manner to perform mold closing and opening operation, which will reduce the work efficiency and operation accuracy.

The present invention has arisen to mitigate and/or obviate the afore-described disadvantages.

SUMMARY OF THE INVENTION

The primary objective of the present invention is to provide a blow molding device for a rotary bottle blowing machine without the disadvantages of complicated structure, low efficiency and accuracy of the conventional blow molding machine.

To achieve the above objective, a blow molding device for a rotary bottle blowing machine in accordance with the present invention comprises:

a support platform with a hole;

a coaxial drive device disposed adjacent to the support platform and including a drive shaft extending along a first direction, and a first control member, a second control member which are sleeved on the drive shaft, the first control member including a first control portion, the second control member including a second control portion, the first control portion is a cam slots extending along the first direction, and the second control portion is a guide slot which consists of at least two slanting sections, and the two slanting sections being symmetrically arranged at an angle with respect to the first direction;

a stationary mold portion being nonrotatably fixed on the support platform;

a movable mold portion being rotatably disposed on the support platform by a movable-mold shaft, the movable-mold shaft being rotated by the first control portion to open and close the movable mold portion with respect to the stationary mold; and a bottom mold portion being mechanically connected to the support platform and capable of sliding with respect to the hole along the first direction, the bottom mold portion being driven to move along the first direction by the second control portion.

A blow molding device for a rotary bottle blowing machine in accordance with another aspect of the present invention comprises:

a support platform with a hole;

a coaxial drive device disposed adjacent to the support platform and including a drive shaft extending along a first direction, and a first control member, a second control member which are sleeved on the drive shaft, the first control member including a first control portion, the second control member including a second control portion, the first control portion is a cam slots extending along the first direction, and the second control portion is a guide slot which consists of at least two slanting sections, and the two slanting sections being symmetrically arranged at an angle with respect to the first direction;

a stationary mold portion being nonrotatably fixed on the support platform;

a movable mold portion being rotatably disposed on the support platform by a movable-mold shaft, the movable-mold shaft being rotated by the first control portion to open and close the movable mold portion with respect to the stationary mold; and a bottom mold portion being mechanically connected to the support platform and capable of sliding with respect to the hole along the first direction, the bottom mold portion being driven to move along the first direction by the second control portion and includes a seat covered with a cover, in the seat is defined an air passage with one open end formed on a lateral surface of the seat and another open end located adjacent to the cover, between the seat and the cover is an airtight cushion, and high pressure air can be injected into the seat via the first open end.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Referring to FIGS. 7-13, a blow molding device for a rotary bottle blowing machine in accordance with a preferred embodiment of the present invention comprises: a support platform 40, a coaxial drive device 50, a stationary mold portion 60, a movable mold portion 70, a bottom mold portion 80, and a mold locking unit 90.

The support platform 40 includes a hole 41, and an extension block 42 extending outward from one side of the support platform 40. On the extension block 42 is formed a guide member 421 extending along a first direction D1, and the guide member 421 in this embodiment is a slide rail.

The coaxial drive device 50 is disposed adjacent to the support platform 40 and includes a drive shaft 51 extending along the first direction D1, and a first control member 52, a second control member 53 and a third control member 54 which are sleeved on the drive shaft 51, in such a manner that the drive shaft 51, and the first, second and third control members 52, 53, 54 all rotate about the first direction D1. The first control member 52 includes a first control portion 521, the second control member 53 includes a second control portion 531, and the third control member 54 includes a third control portion 541. The first and third control portions 521, 541 are located at different heights along the first direction D1, and the second control portion 531 is located between the first and third control portions 521, 541. In this embodiment, the first, second and third control members 52, 53, 54 are cylindrical structures, and the first control member 52 has a diameter larger than a diameter of the third control member 54, and the diameter of the third control member 54 is larger than that of the second control member 53.

In this embodiment, the first and third control portions 521, 541 are two cam slots whose depth extends along the first direction D1, and the second control portion 531 is a guide slot which consists of a first horizontal section 532, a second horizontal section 533 and two slanting sections 534. The first and second horizontal sections 532, 533 are parallel to each other, and the two slanting sections 534 are connected between the first and second horizontal sections 532, 533. The first horizontal section 532 extends horizontally at a first height H1 in the first direction D1, the second horizontal section 533 extends horizontally at a second height H2 which is also located in the first direction D1 and different from the first height H1, and the two slanting sections 534 are symmetrically arranged at an angle with respect to the first direction D1.

The stationary mold portion 60 is nonrotatably fixed on the support platform 40.

The movable mold portion 70 is rotatably disposed on the support platform 40 by a movable-mold shaft 71 in such a manner that the movable-mold shaft 71 is inserted through the support platform 40 and has one end connected to one side of the movable mold portion 70, and another end connected to a first connecting block 72. A movable-mold-portion drive member 73 is connected to the first connecting block 72 and is disposed in and driven to move by the first control portion 521. By such arrangements, the movable-mold shaft 71 can be rotated by the first control member 52 to open and close the movable mold portion 70 with respect to the stationary mold portion 60. The movable-mold-portion drive member 73 and the movable-mold shaft 71 extend in the first direction D1. Another side of the movable mold portion 70 is formed with an assistant mold locking member 74 which includes a stop hook portion 741 with a slanting surface 742.

The bottom mold portion 80 has one side provided with an assistant guide member 81 slidably mounted on the guide member 421. In this embodiment, the assistant guide member 81 is a slide block, so that the bottom mold portion 80 is mechanically connected to the support platform 40 in such a manner that the bottom mold portion 80 is capable of sliding with respect to the hole 41 along the first direction D1. Another side of the bottom mold portion 80 is provided with a bottom-mold-portion drive member 82 which extends into the second control portion 531 and is driven to move by the second control member 53. The bottom mold portion 80 includes a seat 83 covered with a cover 84, in the seat 83 is defined an air passage 831 with one open end 832 formed on a lateral surface of the seat 83 and another open end 833 located adjacent to the cover 84. Between the seat 83 and the cover 84 is an airtight cushion 85, and high pressure air can be injected into the seat 83 via the first open end 832.

The mold locking unit 90 includes a mold locking shaft 91 and a locking block 92. One end of the mold locking shaft 91 is rotatably inserted through the stationary mold portion 60 and connected to the locking block 92, and another end of the mold locking shaft 91 is connected to a second connecting block 93 which is connected to a locking-block drive member 94 disposed in and driven to move by the third control portion 541. The locking-block drive member 94 and the mold locking shaft 91 extend in the first direction D1, the locking block 92 includes a hook portion 921 with a slanting guide surface 922.

The blow molding device of the present invention just needs one drive source to rotate the drive shaft 51 of the coaxial drive device 50, then the drive shaft 51 rotates the first, second and third control members 52, 53, 54, and consequently, the first, second and third control portions 521, 531, 541 of the first, second and third control members 52, 53, 54 will change positions to move the movable mold portion 70, the bottom mold portion 80 and the locking block 92, in such a manner that the movable-mold-portion drive member 73, the bottom-mold-portion drive member 82 and the locking-block drive member 94 which are disposed in the first, second and third control portions 521, 531, 541 will change positions as the shapes of the first, second and third control portions 521, 531, 541 change.

Figure 7:
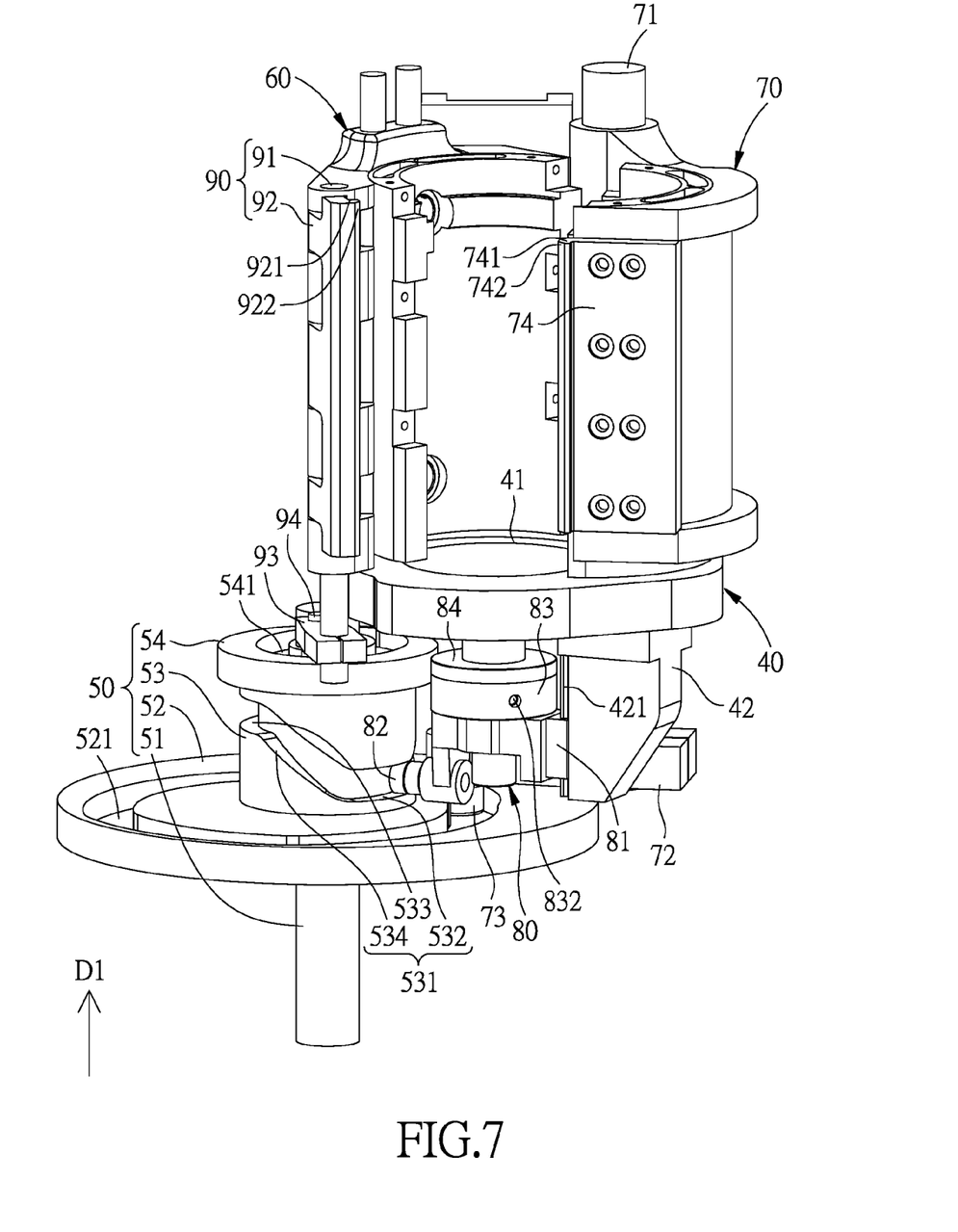
FIG. 7 shows a mold open state of a blow molding device for a rotary bottle blowing machine in accordance with a preferred embodiment of the present invention.
Figure 8:
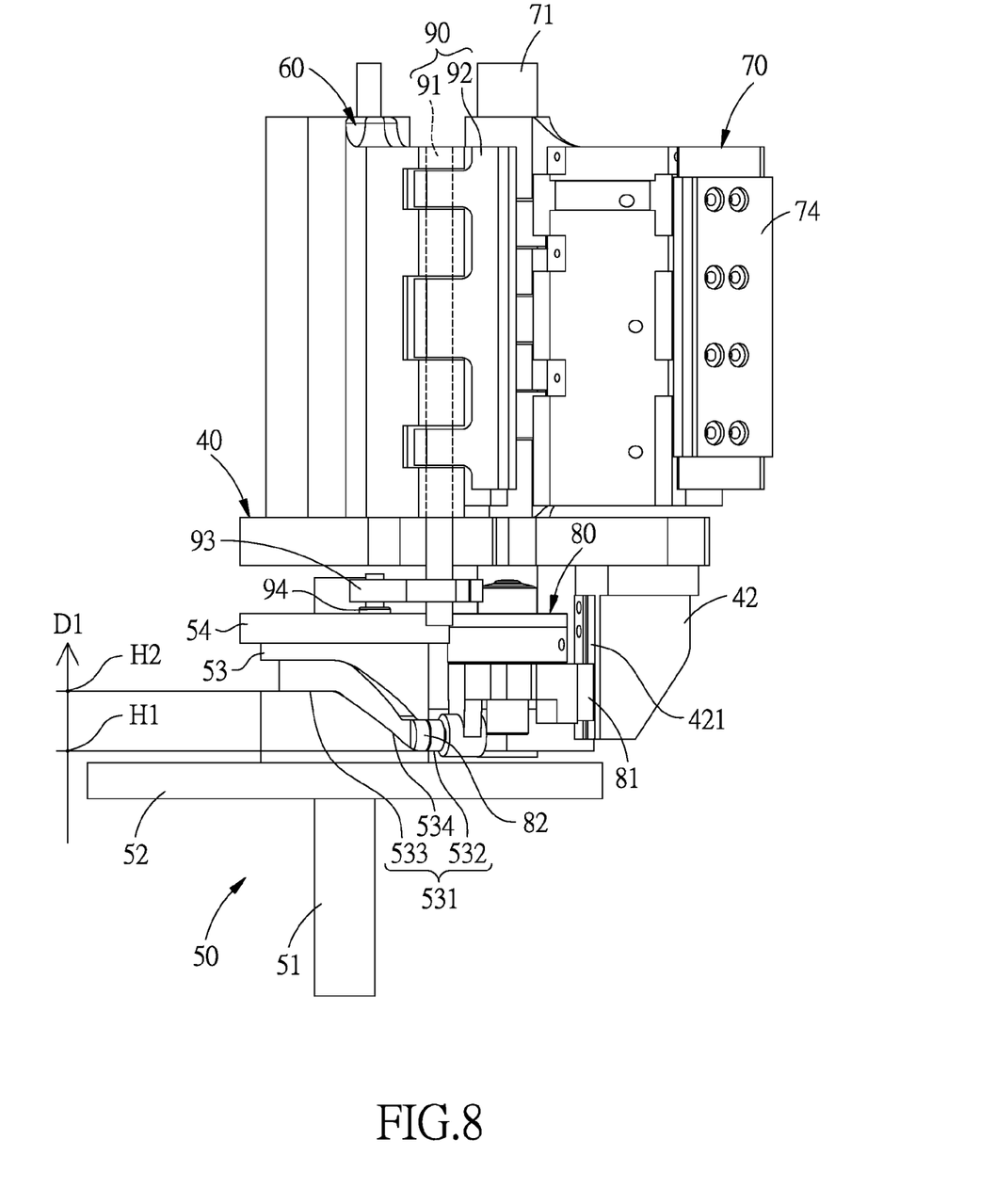
FIG. 8 is a side view showing the mold open state of the blow molding device for a rotary bottle blowing machine in accordance with the preferred embodiment of the present invention.
Figure 9:
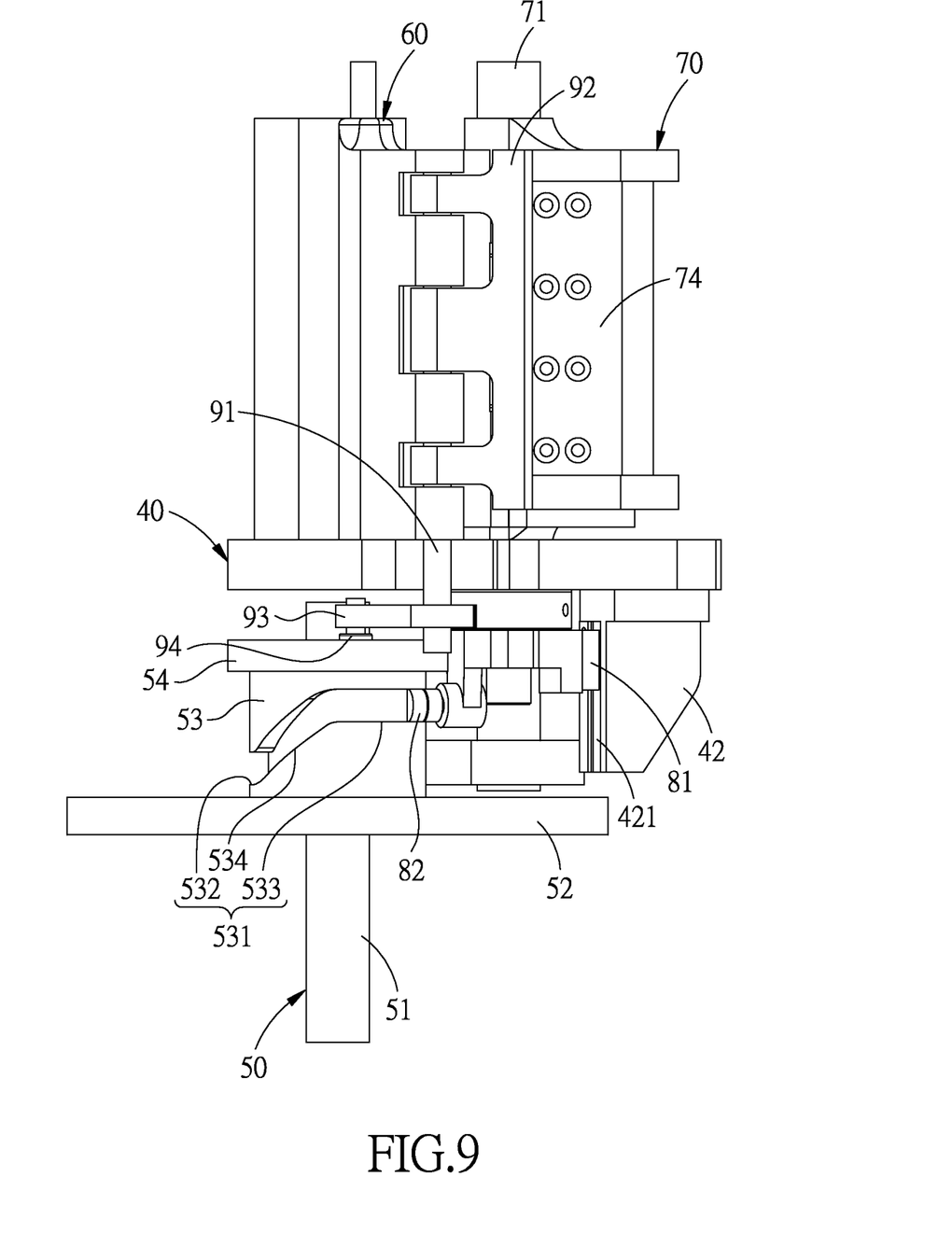
FIG. 9 is a side view showing the mold closed state of the blow molding device for a rotary bottle blowing machine in accordance with the preferred embodiment of the present invention.
Figure 10:
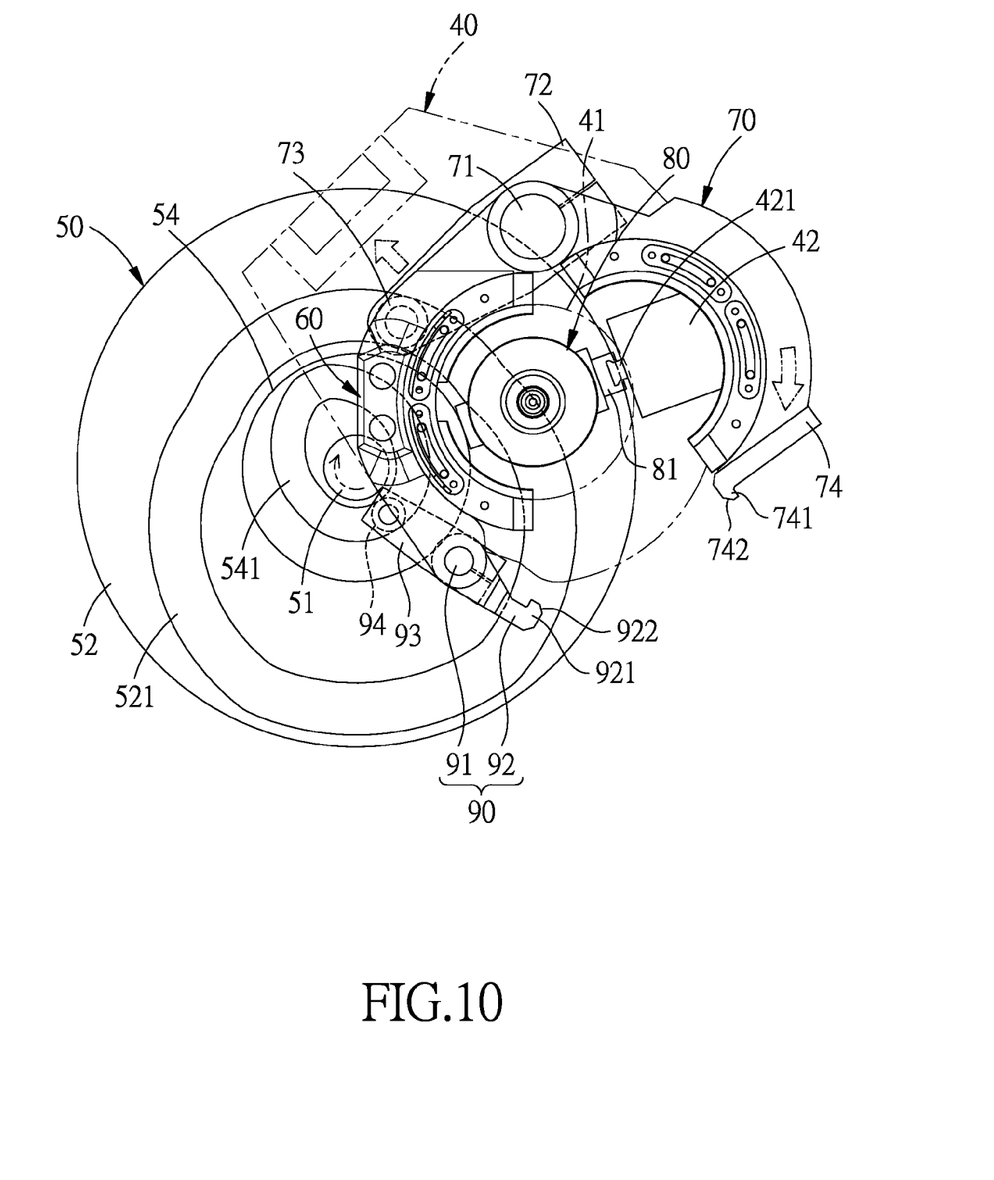
FIG. 10 is a top view showing the mold open state of the blow molding device for a rotary bottle blowing machine in accordance with the preferred embodiment of the present invention.
Figure 11:
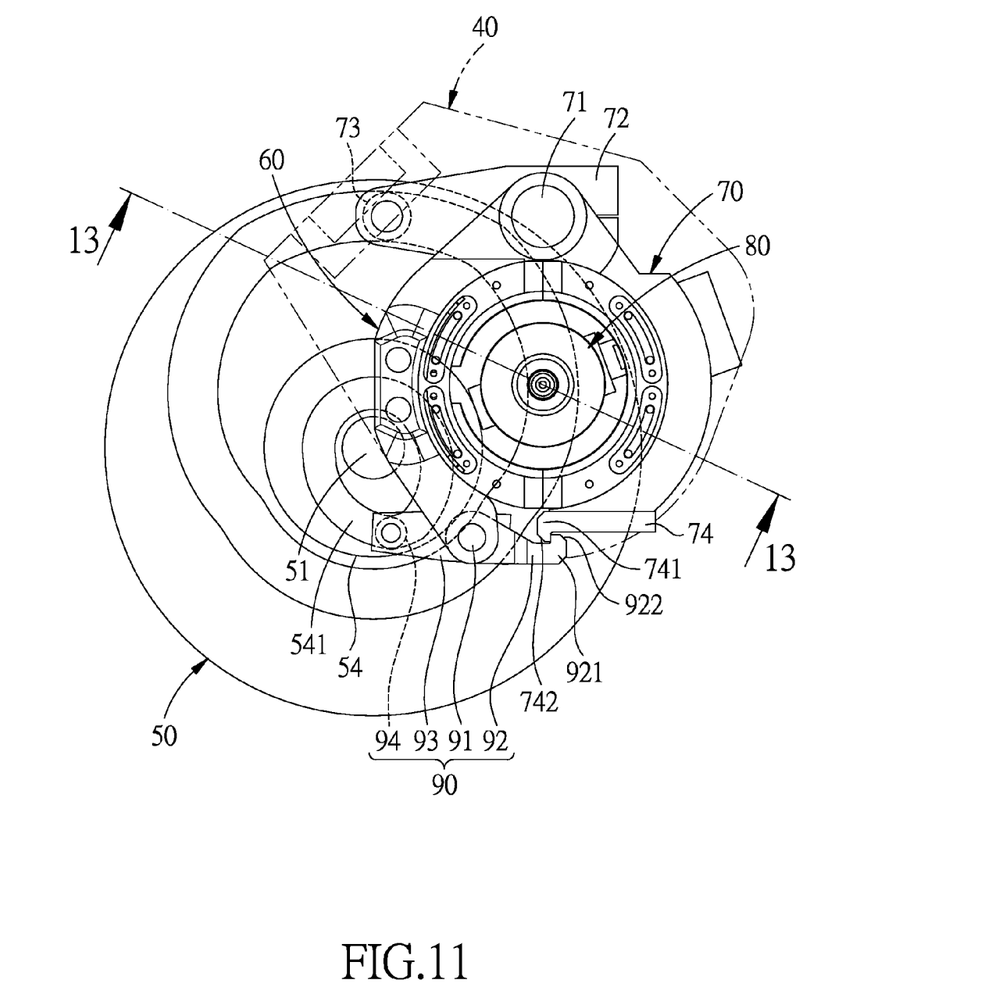
FIG. 11 is a top view showing the mold closed state of the blow molding device for a rotary bottle blowing machine in accordance with the preferred embodiment of the present invention.
Figure 12:
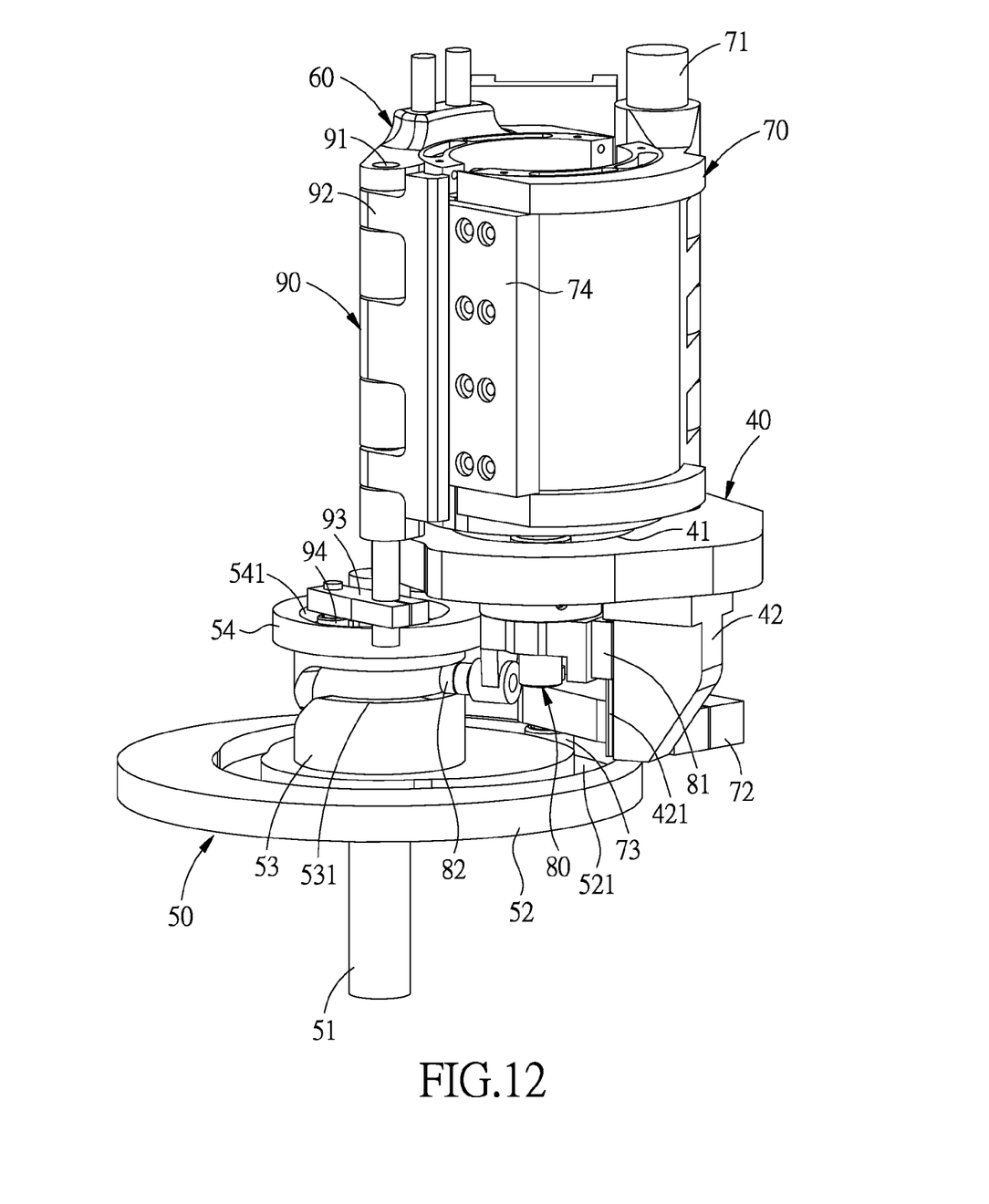
FIG. 12 is a perspective view showing the mold closed state of the blow molding device for a rotary bottle blowing machine in accordance with the preferred embodiment of the present invention.

When the position of the movable-mold-portion drive member 73 is changed, the movable-mold-portion drive member 73 push the movable mold portion 70 with the first connecting block into a mold open position, as shown in FIGS. 7, 8 and 10, or into a mold closed position, as shown in FIGS. 9, 11 and 12. When position of the bottom-mold-portion drive member 82 is changed, the bottom-mold-portion drive member 82 will push the bottom mold portion 80 to move up and down in the first direction D1, and when the movable mold portion 70 is in a mold closed position, the bottom mold portion 80 moves up to a relatively high height in the first direction D1. When position of the locking-block drive member 94 is changed, the locking-block drive member 94 will also use the second connecting block to push the locking block 92 to move. When the movable mold portion 70 is in a mold open position, the locking block 92 will move away from the assistant mold locking member 74, and when the movable mold portion 70 is in a mold closed position, the locking block 92 will move toward the assistant mold locking member 74 until the slanting surface 742 comes into contact with and slides against the slanting guide surface 922 to make the hook portion 921 of the locking block 92 engage with the stop hook portion 741 of the assistant mold locking member 74, so that the movable mold portion 70 is clamped against the stationary mold portion 60 in a locked manner.

It is known from the above description that the blow molding device of the present invention just needs one drive source to rotate the coaxial drive device 50, then the first, second and third control members 52, 53, 54 will move the movable mold portion 70, the bottom mold portion 80 and the locking block 92, carrying out mold opening and closing operation, lifting of the bottom mold portion, and locking and unlocking of the locking block 92. Therefore, the structure of the present invention is simplified, and cost is reduced. In this embodiment, the drive source for rotating the coaxial drive device 50 is a servo motor.

The first, second and third control portions 521, 531, 541 are different slots of different shapes and extending directions, and they drive the movable-mold-portion drive member 73 to move in a direct manner. This direct driving manner will improve operation efficiency and accuracy.

Furthermore, the respective components of the present invention are assembled in a stable manner, the stability and efficiency of the mold opening and closing operation of the present invention can also be ensured, in addition to the fact that the present invention has a stronger structure strength, longer service life and better stability and accuracy.

Figure 13:
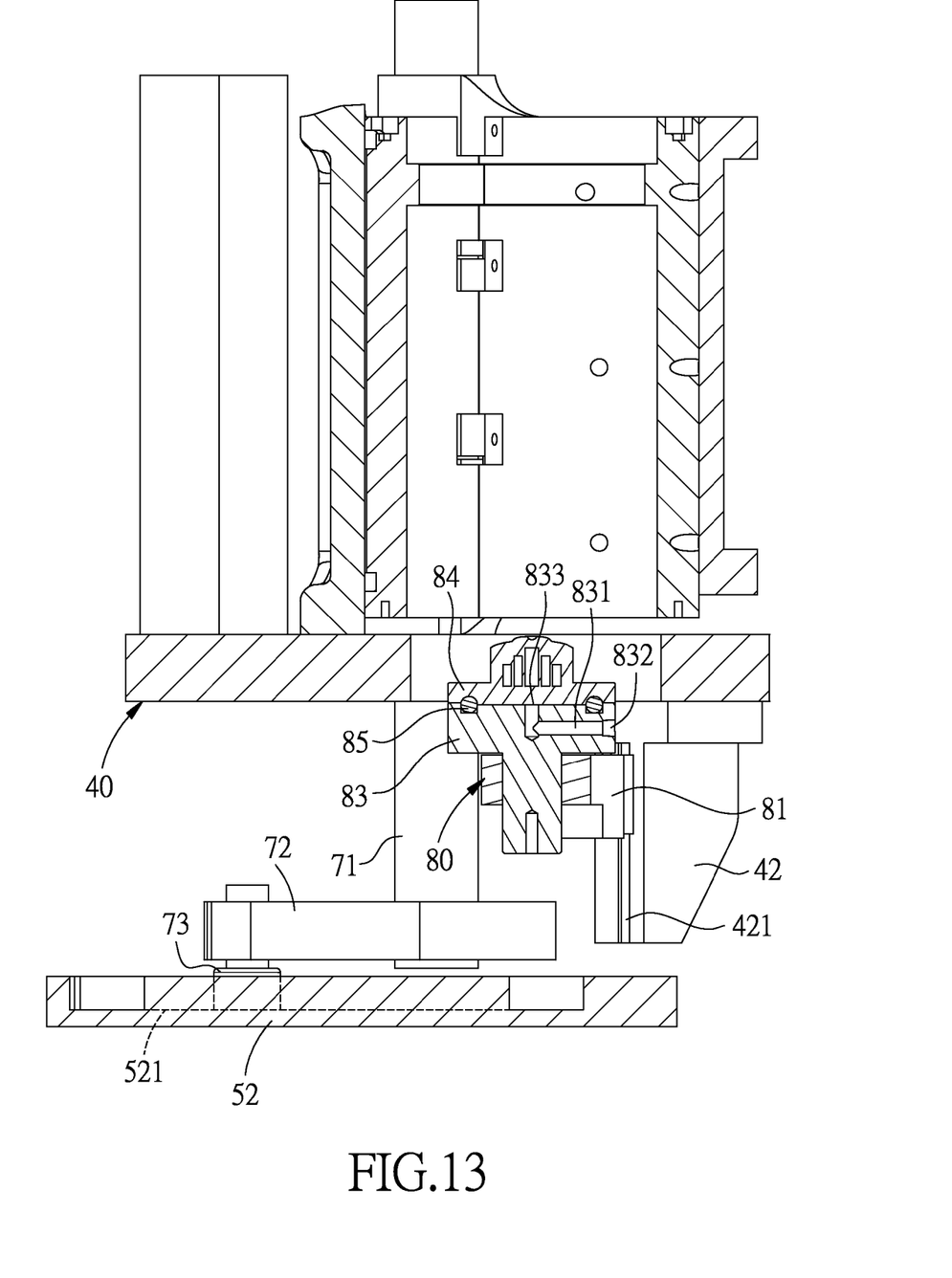
FIG. 13 is a cross sectional view of a part of the blow molding device for a rotary bottle blowing machine in accordance with the present invention.

The movable mold portion 70, the stationary mold portion 60 and the bottom mold portion 80 all will be subjected to a blow-molding force during blow molding process, the mold locking unit 90 can firmly lock the movable mold portion 70 and the stationary mold portion 60. As for the bottom mold portion 80, when high pressure air is injected into the first open end 832 of the air passage 831, the high pressure air will apply pressure onto the cover 84, enabling the bottom mold portion 80 to counteract the blow molding force caused during molding process.

While we have shown and described various embodiments in accordance with the present invention, it is clear to those skilled in the art that further embodiments may be made without departing from the scope of the present invention.

What is claimed is:

1. A blow molding device for a rotary bottle blowing machine comprising:
   a support platform with a hole;
   a coaxial drive device disposed adjacent to the support platform and including a drive shaft extending along a first direction, and a first control member, a second control member which are sleeved on the drive shaft, the first control member including a first control portion, the second control member including a second control portion, the first control portion is a cam slot whose depth extends along the first direction, and the second control portion is a guide slot which consists of at least two slanting sections, and the two slanting sections being symmetrically arranged at an angle with respect to the first direction;
   a stationary mold portion being nonrotatably fixed on the support platform;
   a movable mold portion being rotatably disposed on the support platform by a movable-mold shaft, the movable-mold shaft being rotated by the first control portion to open and close the movable mold portion with respect to the stationary mold portion; and
   a bottom mold portion being mechanically supported to the support platform and capable of sliding with respect to the hole along the first direction, the bottom mold portion being driven to move along the first direction by the second control portion.

2. The blow molding device for the rotary bottle blowing machine as claimed in claim 1, wherein the movable-mold shaft is inserted through the support platform and has one end connected to one side of the movable mold portion.

3. The blow molding device for the rotary bottle blowing machine as claimed in claim 1, wherein the movable-mold shaft is inserted through the support platform and has one end connected to one side of the movable mold portion, and another end connected to a first connecting block, a movable-mold-portion drive member is connected to the first connecting block and disposed in and driven to move by the first control portion, and the movable-mold-portion drive member and the movable-mold shaft extend in the first direction.

4. The blow molding device for the rotary bottle blowing machine as claimed in claim 1, wherein the support platform includes an extension block extending outward from one side of the support platform, on the extension block is formed a guide member extending along the first direction, the bottom mold portion has one side provided with an assistant guide member slidably mounted on the guide member, the guide member is a slide rail, and the assistant guide member is a slide block.

5. The blow molding device for the rotary bottle blowing machine as claimed in claim 1, wherein the support platform includes an extension block extending outward from one side of the support platform, on the extension block is formed a guide member extending along the first direction, the bottom mold portion has one side provided with an assistant guide member slidably mounted on the guide member, another side of the bottom mold portion is provided with a bottom-mold-portion drive member which extends into the second control portion and is driven to move by the second control member.

6. The blow molding device for the rotary bottle blowing machine as claimed in claim 1, wherein the second control portion consists of a first horizontal section, a second horizontal section and the two slanting sections, the first and second horizontal sections are parallel to each other and located at different heights in the first direction, and the two slanting sections are connected between the first and second horizontal sections.

7. The blow molding device for the rotary bottle blowing machine as claimed in claim 1, wherein the coaxial drive device further includes a third control member, the third control member includes a third control portion taking the form of a cam slot extending along the first direction, the bottom mold portion further includes a mold locking shaft, one end of the mold locking shaft is rotatably connected to a locking block, and another end of the mold locking shaft is connected to a second connecting block which is connected to a locking-block drive member, the locking-block drive member is disposed in and driven to move by the third control portion, the locking-block drive member and the mold locking shaft extend in the first direction, the locking block includes a hook portion, one side of the movable mold portion is formed with an assistant mold locking member which includes a stop hook portion, and the locking block is controlled by the third control portion to engage with or disengage from the assistant mold locking member.

8. The blow molding device for the rotary bottle blowing machine as claimed in claim 7, wherein the hook portion of the locking block includes a hook portion has a slanting guide surface, the stop hook portion of the assistant mold locking member has a slanting surface, when the locking block moves toward the assistant mold locking member until the slanting surface comes into contact with the slanting guide surface, the slanting surface slides against the slanting guide surface to make the hook portion of the locking block engage with the stop hook portion of the assistant mold locking member.

9. The blow molding device for the rotary bottle blowing machine as claimed in claim 1, wherein the bottom mold portion includes a seat covered with a cover, in the seat is defined an air passage with one open end formed on a lateral surface of the seat and another open end located adjacent to the cover, between the seat and the cover is an airtight cushion, and high pressure air can be injected into the seat via the first open end.

\* \* \* \* \*